(12) United States Patent
Uchida

(10) Patent No.: US 6,718,059 B1
(45) Date of Patent: Apr. 6, 2004

(54) BLOCK SELECTION-BASED IMAGE PROCESSING

(75) Inventor: Yoshiki Uchida, Newport Beach, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/458,941

(22) Filed: Dec. 10, 1999

(51) Int. Cl.$^7$ .................................................. G06K 9/34
(52) U.S. Cl. ...................... 382/176; 382/177; 382/261; 358/462; 358/453
(58) Field of Search ................................. 382/176, 177, 382/173, 174, 175, 309, 300, 180, 261, 262, 263, 264, 265, 266, 270; 358/296, 500, 1.9, 532, 453, 462, 467; 348/606, 610

(56) References Cited

U.S. PATENT DOCUMENTS

| | | | |
|---|---|---|---|
| 5,296,939 A | 3/1994 | Suzuki ........................ 358/453 |
| 5,361,147 A | 11/1994 | Katayama et al. .......... 358/532 |
| 5,420,938 A | 5/1995 | Funada et al. ............... 382/173 |
| 5,680,479 A | 10/1997 | Wang et al. ................. 382/176 |
| 5,684,600 A | * 11/1997 | Miyazaki et al. ........... 358/3.24 |
| 5,696,842 A | * 12/1997 | Shirasawa et al. .......... 382/176 |
| 5,715,377 A | 2/1998 | Fukushima et al. ......... 395/109 |
| 5,729,360 A | 3/1998 | Kita et al. ................... 358/500 |
| 5,754,710 A | 5/1998 | Sekine et al. ................ 382/300 |
| 5,774,579 A | 6/1998 | Wang et al. ................. 382/176 |
| 5,778,092 A | * 7/1998 | MacLeod et al. ........... 382/176 |
| 5,825,944 A | 10/1998 | Wang ........................... 382/309 |
| 5,844,688 A | 12/1998 | Shimizu et al. ............. 358/296 |
| 5,848,186 A | 12/1998 | Wang et al. ................. 382/176 |
| 5,854,854 A | * 12/1998 | Cullen et al. ............... 382/176 |
| 6,356,655 B1 | * 3/2002 | Sumikawa et al. ......... 382/175 |

FOREIGN PATENT DOCUMENTS

EP  0 662 765  7/1995  ............ H04N/1/62

* cited by examiner

Primary Examiner—Bhavesh M. Mehta
Assistant Examiner—Ali Bayat
(74) Attorney, Agent, or Firm—Fitzpatrick, Cella, Harper & Scinto

(57) ABSTRACT

An image processing system includes input of image data, performance of block selection processing on the input image data to determine types of pixel data within the image data, a first determining step of determining, based on the block selection processing, if subject pixel data represents a text pixel, a second determining step of determining if the subject pixel data represents an edge pixel, performance of a first processing on the subject pixel data in a case that the subject pixel data is determined to represent a text pixel and an edge pixel, and performance of a second processing on the subject pixel data in a case that the subject pixel data is not determined to represent a text pixel and is not determined to represent an edge pixel.

21 Claims, 18 Drawing Sheets

Canon

Canon Information Systems, Inc.
Technical Information Center Newsletter
Published by Joyce Peluso
April 27, 1992, Volume 2, No. 4-4

Canon Wants Mutually Rewarding Coexistence

Source: Fortune, 7/29/91

Ryuzaburo Kaku, Chairman of the Board of Canon, Inc. in his recent interview had the following to say about the corporate world. The world is divided into four types of companies:
(1) Purely capitalistic enterprises that exploit their workers for profit.
(2) Those where management and labor work closely together to maximize profits, but don't pay enough attention to the community
(3) A company that both tries to make money but also seeks to fulfill its corporate responsibilities to society, but in a small scale way to a particular country or region.
(4) A highly evolved type of company that contributes positively to world prosperity.

Canon is aspiring to be the fourth type of company. This is a company that is socially responsible and practices good corporate citizenship at home and overseas and that can be referred to as a true global corporation. We have a basic philosophy to achieve a mutually rewarding coexistence among employees, shareholders, customers and the communities in which we do business.

Ryuzaburo Kaka, Chairman of the Board of Canon Inc. continued to say about the four companies... This is a company practicing good corporate and civic policies, a company concerned about it's employees and shareholders.

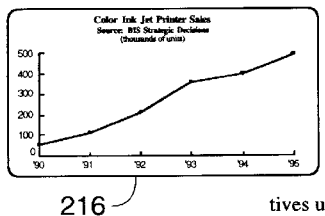

Fig 1: Mr. Hideharu Takemoto

Canon's Corporate Culture to Blend Best of U.S. & Japan

Source: Fortune, 8/26/91

Mr. Hideharu Takemoto, President of Canon U.S.A. was recently interviewed by Fortune Magazine and had the following to say about Canon in North America.

Mr. Takemoto wants to create a new Canon corporate culture, "The best of American and Japanese cultures must be blended to produce a richer corporate alchemy--a new ideal."

Canon wants to create more jobs for Americans in the 1990s and to make them an integral part of the Canon family. Mr. Takemoto is further committed to cultivating local talent and moving local executives up through the ranks of Canon's highest corporate echelons.

Canon Develops World's First Ferroelectric Liquid Crystal Display

Source: Wall Street Journal, 10/2/91,
Canon Press Release, 10/1/91

In a news conference yesterday, Hiroshi Tanaka, a Canon senior managing director said that the company has succeeded in developing the world's first ferroelectric liquid crystal (FLC) display screen. The screen will be test marketed next spring in Canon's EZPS Japanese language DTP system.

Ink-Jet Printer Market Share
Source: Computer Reseller News/Info Corp

| Selected Ink-Jet printers | March | April | May | June |
|---|---|---|---|---|
| AppleStylewriter | 17.5% | 26.7% | 41.5% | 31.5% |
| H-P |  |  |  |  |
| PaintJet | <1% | 2% | <1% | <1% |
| DeskJet500 | 49% | 39% | 31.6% | 24.6% |
| DeskWriter | 31% | 27.3% | 20.4% | 14.9% |
| H-P |  |  |  |  |
| BJ10E | <1% | 3.4% | 4.3% | 7.9% |
| BJ300/330 | <1% | <1% | <1% | <1% |

FIG. 5

| COL | ATTRIBUTE | FONT SIZE | EDGE | UCR | FILTER | SEN |
|---|---|---|---|---|---|---|
| BLACK | TEXT | 0 | INTERNAL | 3 | 0 | 0 |
| | | | 1X1 | 0 | 1 | 1 |
| | | | 3X3 | 0 | 1 | 1 |
| | | | 5X5 | 0 | 1 | 1 |
| | | | 7X7 | 0 | 1 | 1 |
| | | 1 | INTERNAL | 3 | 0 | 0 |
| | | | 1X1 | 1 | 1 | 1 |
| | | | 3X3 | 1 | 1 | 1 |
| | | | 5X5 | 1 | 1 | 1 |
| | | | 7X7 | 3 | 0 | 0 |
| | | 2 | INTERNAL | 4 | 0 | 0 |
| | | | 1X1 | 2 | 1 | 1 |
| | | | 3X3 | 2 | 1 | 1 |
| | | | 5X5 | 2 | 0 | 0 |
| | | | 7X7 | 4 | 0 | 0 |
| | | 3 | INTERNAL | 5 | 0 | 0 |
| | | | 1X1 | 3 | 1 | 0 |
| | | | 3X3 | 3 | 1 | 0 |
| | | | 5X5 | 5 | 0 | 0 |
| | | | 7X7 | 5 | 0 | 0 |
| | | 4 | INTERNAL | 6 | 0 | 0 |
| | | | 1X1 | 4 | 2 | 0 |
| | | | 3X3 | 4 | 2 | 0 |
| | | | 5X5 | 6 | 0 | 0 |
| | | | 7X7 | 6 | 0 | 0 |
| | | 5 | INTERNAL | 7 | 0 | 0 |
| | | | 1X1 | 5 | 2 | 0 |
| | | | 3X3 | 5 | 2 | 0 |
| | | | 5X5 | 7 | 0 | 0 |
| | | | 7X7 | 7 | 0 | 0 |

FIG. 12A

| COL | ATTRIBUTE | FONT SIZE | EDGE | UCR | FILTER | SEN |
|---|---|---|---|---|---|---|
| | | 6 | INTERNAL | 7 | 0 | 0 |
| | | | 1X1 | 6 | 2 | 0 |
| | | | 3X3 | 7 | 0 | 0 |
| | | | 5X5 | 7 | 0 | 0 |
| | | | 7X7 | 7 | 0 | 0 |
| | | 7 | INTERNAL | 7 | 3 | 0 |
| | | | 1X1 | 7 | 3 | 0 |
| | | | 3X3 | 7 | 3 | 0 |
| | | | 5X5 | 7 | 3 | 0 |
| | | | 7X7 | 7 | 3 | 0 |
| | TEXT ON HALFTONE | 0 | INTERNAL | 7 | 3 | 0 |
| | | | 1X1 | 7 | 3 | 0 |
| | | | 3X3 | 3 | 1 | 0 |
| | | | 5X5 | 7 | 3 | 0 |
| | | | 7X7 | 7 | 3 | 0 |
| | | 1 | INTERNAL | 7 | 3 | 0 |
| | | | 1X1 | 3 | 1 | 0 |
| | | | 3X3 | 7 | 3 | 0 |
| | | | 5X5 | 7 | 3 | 0 |
| | | | 7X7 | 7 | 3 | 0 |
| | | 2 | INTERNAL | 7 | 1 | 0 |
| | | | 1X1 | 3 | 3 | 0 |
| | | | 3X3 | 7 | 3 | 0 |
| | | | 5X5 | 7 | 3 | 0 |
| | | | 7X7 | 7 | 3 | 0 |
| | | 3 | INTERNAL | 7 | 3 | 0 |
| | | | 1X1 | 3 | 1 | 0 |
| | | | 3X3 | 7 | 3 | 0 |
| | | | 5X5 | 7 | 3 | 0 |
| | | | 7X7 | 7 | 3 | 0 |

FIG. 12B

| COL | ATTRIBUTE | FONT SIZE | EDGE | UCR | FILTER | SEN |
|---|---|---|---|---|---|---|
| | | 4 | INTERNAL | 7 | 3 | 0 |
| | | | 1X1 | 3 | 1 | 0 |
| | | | 3X3 | 7 | 3 | 0 |
| | | | 5X5 | 7 | 3 | 0 |
| | | | 7X7 | 7 | 3 | 0 |
| | | 5 | INTERNAL | 7 | 3 | 0 |
| | | | 1X1 | 3 | 1 | 0 |
| | | | 3X3 | 7 | 3 | 0 |
| | | | 5X5 | 7 | 3 | 0 |
| | | | 7X7 | 7 | 3 | 0 |
| | | 6 | INTERNAL | 7 | 3 | 0 |
| | | | 1X1 | 3 | 2 | 0 |
| | | | 3X3 | 7 | 3 | 0 |
| | | | 5X5 | 7 | 3 | 0 |
| | | | 7X7 | 7 | 3 | 0 |
| | | 7 | INTERNAL | 7 | 3 | 0 |
| | | | 1X1 | 7 | 2 | 0 |
| | | | 3X3 | 7 | 3 | 0 |
| | | | 5X5 | 7 | 3 | 0 |
| | | | 7X7 | 7 | 3 | 0 |
| | LINE ART | - | INTERNAL | 7 | 3 | 0 |
| | | | 1X1 | 2 | 2 | 0 |
| | | | 3X3 | 7 | 3 | 0 |
| | | | 5X5 | 7 | 3 | 0 |
| | | | 7X7 | 7 | 3 | 0 |
| | LINE | - | INTERNAL | 7 | 3 | 0 |
| | | | 1X1 | 2 | 1 | 1 |
| | | | 3X3 | 7 | 2 | 0 |
| | | | 5X5 | 7 | 3 | 0 |
| | | | 7X7 | 7 | 3 | 0 |

FIG. 12C

| COL | ATTRIBUTE | FONT SIZE | EDGE | UCR | FILTER | SEN |
|---|---|---|---|---|---|---|
| | TITLE | - | INTERNAL | 7 | 3 | 0 |
| | | | 1X1 | 3 | 2 | 0 |
| | | | 3X3 | 7 | 3 | 0 |
| | | | 5X5 | 7 | 3 | 0 |
| | | | 7X7 | 7 | 3 | 0 |
| | TABLE | - | INTERNAL | 7 | 3 | 0 |
| | | | 1X1 | 1 | 1 | 1 |
| | | | 3X3 | 3 | 1 | 0 |
| | | | 5X5 | 5 | 3 | 0 |
| | | | 7X7 | 7 | 3 | 0 |
| - | HALFTONE | - | - | 7 | 3 | 0 |
| - | FRAME | - | - | 7 | 3 | 0 |
| - | BACKGROUND | - | - | 7 | 3 | 0 |

-: DON'T CARE

FIG. 12D

| COL | ATTRIBUTE | FONT SIZE | EDGE | UCR | FILTER | SEN |
|---|---|---|---|---|---|---|
| OTHER THAN BLACK | TEXT | 0 | INTERNAL | 7 | 0 | 0 |
| | | | 1X1 | 7 | 2 | 1 |
| | | | 3X3 | 7 | 2 | 1 |
| | | | 5X5 | 7 | 2 | 1 |
| | | | 7X7 | 7 | 2 | 1 |
| | | 1 | INTERNAL | 7 | 0 | 0 |
| | | | 1X1 | 7 | 2 | 1 |
| | | | 3X3 | 7 | 2 | 1 |
| | | | 5X5 | 7 | 2 | 1 |
| | | | 7X7 | 7 | 0 | 0 |
| | | 2 | INTERNAL | 7 | 0 | 0 |
| | | | 1X1 | 7 | 2 | 1 |
| | | | 3X3 | 7 | 2 | 1 |
| | | | 5X5 | 7 | 0 | 0 |
| | | | 7X7 | 7 | 0 | 0 |
| | | 3 | INTERNAL | 7 | 0 | 0 |
| | | | 1X1 | 7 | 2 | 0 |
| | | | 3X3 | 7 | 2 | 0 |
| | | | 5X5 | 7 | 0 | 0 |
| | | | 7X7 | 7 | 0 | 0 |
| | | 4 | INTERNAL | 7 | 0 | 0 |
| | | | 1X1 | 7 | 2 | 0 |
| | | | 3X3 | 7 | 2 | 0 |
| | | | 5X5 | 7 | 0 | 0 |
| | | | 7X7 | 7 | 0 | 0 |
| | | 5 | INTERNAL | 7 | 0 | 0 |
| | | | 1X1 | 7 | 2 | 0 |
| | | | 3X3 | 7 | 2 | 0 |
| | | | 5X5 | 7 | 0 | 0 |
| | | | 7X7 | 7 | 0 | 0 |

FIG. 12E

| COL | ATTRIBUTE | FONT SIZE | EDGE | UCR | FILTER | SEN |
|---|---|---|---|---|---|---|
| | | 6 | INTERNAL | 7 | 0 | 0 |
| | | | 1X1 | 7 | 2 | 0 |
| | | | 3X3 | 7 | 0 | 0 |
| | | | 5X5 | 7 | 0 | 0 |
| | | | 7X7 | 7 | 0 | 0 |
| | | 7 | INTERNAL | 7 | 3 | 0 |
| | | | 1X1 | 7 | 3 | 0 |
| | | | 3X3 | 7 | 3 | 0 |
| | | | 5X5 | 7 | 3 | 0 |
| | | | 7X7 | 7 | 3 | 0 |
| | TEXT ON HALFTONE | - | INTERNAL | 7 | 3 | 0 |
| | | | 1X1 | 7 | 2 | 0 |
| | | | 3X3 | 7 | 3 | 0 |
| | | | 5X5 | 7 | 3 | 0 |
| | | | 7X7 | 7 | 3 | 0 |
| | LINE ART | - | INTERNAL | 7 | 3 | 0 |
| | | | 1X1 | 7 | 2 | 0 |
| | | | 3X3 | 7 | 3 | 0 |
| | | | 5X5 | 7 | 3 | 0 |
| | | | 7X7 | 7 | 3 | 0 |
| | LINE | - | INTERNAL | 7 | 3 | 0 |
| | | | 1X1 | 7 | 2 | 1 |
| | | | 3X3 | 7 | 2 | 0 |
| | | | 5X5 | 7 | 3 | 0 |
| | | | 7X7 | 7 | 3 | 0 |
| | TITLE | - | INTERNAL | 7 | 3 | 0 |
| | | | 1X1 | 7 | 2 | 0 |
| | | | 3X3 | 7 | 3 | 0 |
| | | | 5X5 | 7 | 3 | 0 |
| | | | 7X7 | 7 | 3 | 0 |

FIG. 12F

| COL | ATTRIBUTE | FONT SIZE | EDGE | UCR | FILTER | SEN |
|---|---|---|---|---|---|---|
| | TABLE | - | INTERNAL | 7 | 3 | 0 |
| | | | 1X1 | 7 | 2 | 1 |
| | | | 3X3 | 7 | 2 | 0 |
| | | | 5X5 | 7 | 3 | 0 |
| | | | 7X7 | 7 | 3 | 0 |

-: DON'T CARE

FIG. 12G

BLOCK SELECTION-BASED IMAGE PROCESSING

INCORPORATION BY REFERENCE

Commonly-assigned U.S. patent application Ser. No. 07/873,012, now U.S. Pat. No. 5,680,479, entitled "Method and Apparatus For Character Recognition", Ser. No. 08/171,720, now U.S. Pat. No. 5,588,072, entitled "Method and Apparatus For Selecting Text And/Or Non-Text Blocks In A Stored Document", Ser. No. 08/338,781,entitled "Page Analysis System", Ser. No. 08/514,250, now U.S. Pat. No. 5,774,579, entitled "Block Selection System In Which Overlapping Blocks Are Decomposed", Ser. No. 08/514,252, now U.S. Pat. No. 5,848,186, entitled "Feature Extraction System", Ser. No. 08/664,674, entitled "System For Extracting Attached Text", Ser. No. 08/751,677, entitled "Page Analysis System", Ser. No. 08/834,856, now U.S. Pat. No. 5,825,944, entitled "Block Selection Review and Editing System", Ser. No. 09/002,684, entitled "System For Analyzing Table Images", Ser. No. 09/161,716, entitled "Color Block Selection", and Ser. No. 09/222,860, entitled "Block Selection Of Table Features", are herein incorporated as if set forth in full.

BACKGROUND OF THE INVENTION

1. Field of the Invention

The present invention relates to systems for processing pixel data. More specifically, the present invention concerns image processing systems in which input pixel data is processed based on detected characteristics of the pixel data.

2. Description of the Related Art

Conventional image processing systems such as a color copier obtain pixel data by scanning an original document, and perform various image processing steps on the data to produce output data suitable for delivery to a laser beam reproduction engine, an ink jet reproduction system, or the like. In particular, conventional image processing systems, such as that in U.S. patent application Ser. No. 08/954,226, which is a continuation application of U.S. patent application Ser. No. 08/365,678, entitled "Image Processing Apparatus And Method", first receive red (R), green (G) and blue (B) signals representing a scanned image from a charge-coupled device (CCD). The received signals are then subjected to image processing.

FIG. 1 is a diagram illustrating such image processing. As shown in FIG. 1, image signals output from a CCD are input to analog signal processing unit 101, wherein the signal is processed with gain and offset adjustment. Next, each of the R, G and B signals is converted into an 8-bit digital image signal, R1, G1, and B1, respectively, by A/D converter 102. These signals are then input to shading correction circuit 103 for application of shading correction to each signal. Line delay circuits 104 and 105 are used to compensate for spacing of sensors within the CCD so as to match timing between each of the R1, G1 and B1 signals such that, after line delay circuit 105, values of the R, G and B signals at a same point in time represent a same pixel.

Input masking unit 106 converts a reading color space, determined by color decomposition characteristics of the CCD, into a standard color space, and log converter 107 converts luminance signals R4, G4 and B4 into density signals C0, M0 and Y0. The density signals are delayed by line delay memory 108 until determination signals UCR (under color removal), FILTER and SEN can be generated. After delay of the signals by line delay memory 108, masking UCR circuit 109 extracts black signals from the density signals using the UCR signal and variable magnification circuit 110 expands and compresses an image signal and a black character determination signal in the main scanning direction. Space filter processing unit 111 performs filtering using the FILTER signal and the resulting frame-sequential image signals M4, C4, Y4 and Bk4 are sent to reproduction engine 112 along with the SEN signal, which determines the resolution at which the image is output.

According to application Ser. No. 08/954,226, the foregoing UCR, FILTER and SEN signals are output from black character determination unit 115. Specifically, the UCR signal generated by black character determination unit 113 has a value from 0 to 7 indicating, from more black to less black, an amount of black component which should be removed from signals Y1, M1, and C1 by masking UCR circuit 109 to produce signal Bk2. The FILTER signal produced by black character determination unit 113 is a 2-bit value in which values 0, 1, 2 and 3 indicated smoothing, strong edge enhancement, medium edge enhancement, and weak edge enhancement, respectively. Accordingly, the FILTER signal is input to space filter processing unit 111 to control an amount and type of filtering applied to signals Y3, M3, C3 and Bk3.

The SEN signal is output from black character determination unit 113 to reproduction engine 112, and is a 1-bit signal in which a 0 value indicates to engine 112 that printing should proceed at 200 lines per inch resolution, and the value 1 indicates that 400 lines per inch printing is required.

The values of UCR, FILTER and SEN are outputs of look-up table (LUT) 117, which receives signals indicating a width of a character containing a subject pixel, a proximity of the subject pixel to an edge of a character, and a chromaticity of the subject pixel. Therefore, the output values of UCR, FILTER, and SEN are calculated for each subject pixel and are determined based on a detected character width, edge proximity and chromaticity corresponding to the pixel according to relationships specified by the LUT.

For example, a FILTER signal value of 1 is used for a subject pixel which is located near to an edge, has low chromaticity and is included in a relatively thin character, since such factors suggest that the pixel is within a small, black character. In another example, the SEN signal is assigned a value of 0 (corresponding to 200 lines per inch resolution) in a case that the subject pixel is not near an edge and is included in a very thick area, since larger toner dots, which provide more toner per unit area than larger dots, generate a better halftone image.

As can be seen from the foregoing, conventional image processing systems such as that described in U.S. application Ser. No. 08/954,226 "guess" the nature of a subject pixel based on several factors in order to then determine appropriate processing parameters for the pixel. One drawback to such an approach is that the guessed nature may be incorrect, resulting in inappropriate processing being performed on the pixel.

In view of the foregoing, what is needed is an image processing system to improve image processing using accurately and inexpensively detected attributes of input image data.

SUMMARY OF THE INVENTION

The present invention addresses the foregoing problems by utilizing results of block selection processing to determine processing to be applied to data of a subject pixel. Using the results of block selection processing, the nature of a subject pixel can be more specifically identified than when using the conventional systems described above, therefore more appropriate processing can be applied to the pixel data. In addition, image processing proceeds quickly using such block selection processing in combination with existing image processing hardware. Moreover, block selection processing is preferably software-based and therefore inexpensive to implement.

Particularly, the present invention is directed to an image processing system in which image data is input, block selection processing is performed on the input image data to determine types of pixel data within the image data, it is determined, based on the block selection processing, if subject pixel data represents a text pixel, and it is determined if the subject pixel data represents an edge pixel. A first processing is performed on the pixel data in a case that the pixel data is determined to represent a text pixel and an edge pixel, and a second processing is performed on the pixel data in a case that the pixel data is not determined to represent a text pixel and is not determined to represent an edge pixel.

By virtue of the foregoing features, inexpensive and appropriate image processing can be applied to image data. For example, the first processing is preferably a sharpening processing and the second processing is preferably a smoothing processing.

In a further aspect of the present invention, the inputting step includes pre-scanning image data at a first resolution, and scanning the image data at a second resolution, the second resolution higher than the first resolution, wherein the block selection processing is performed on the image data at the first resolution, and wherein the sharpening processing and the smoothing processing are performed on the image data at the second resolution. This further aspect allows overall processing to be completed quickly.

It should also be noted that the invention contemplates determining if types of pixel data are text on halftone, line art, line, title, table, halftone, frame and background. Accordingly, appropriate image processing can be applied to the image data based on these pixel data types.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 5 is a view of a document containing pixel data for processing according to the present invention.

FIG. 12A to FIG. 12G illustrate the contents of a lookup table according to the present invention.

DETAILED DESCRIPTION OF THE PREFERRED EMBODIMENTS

Figure 2:
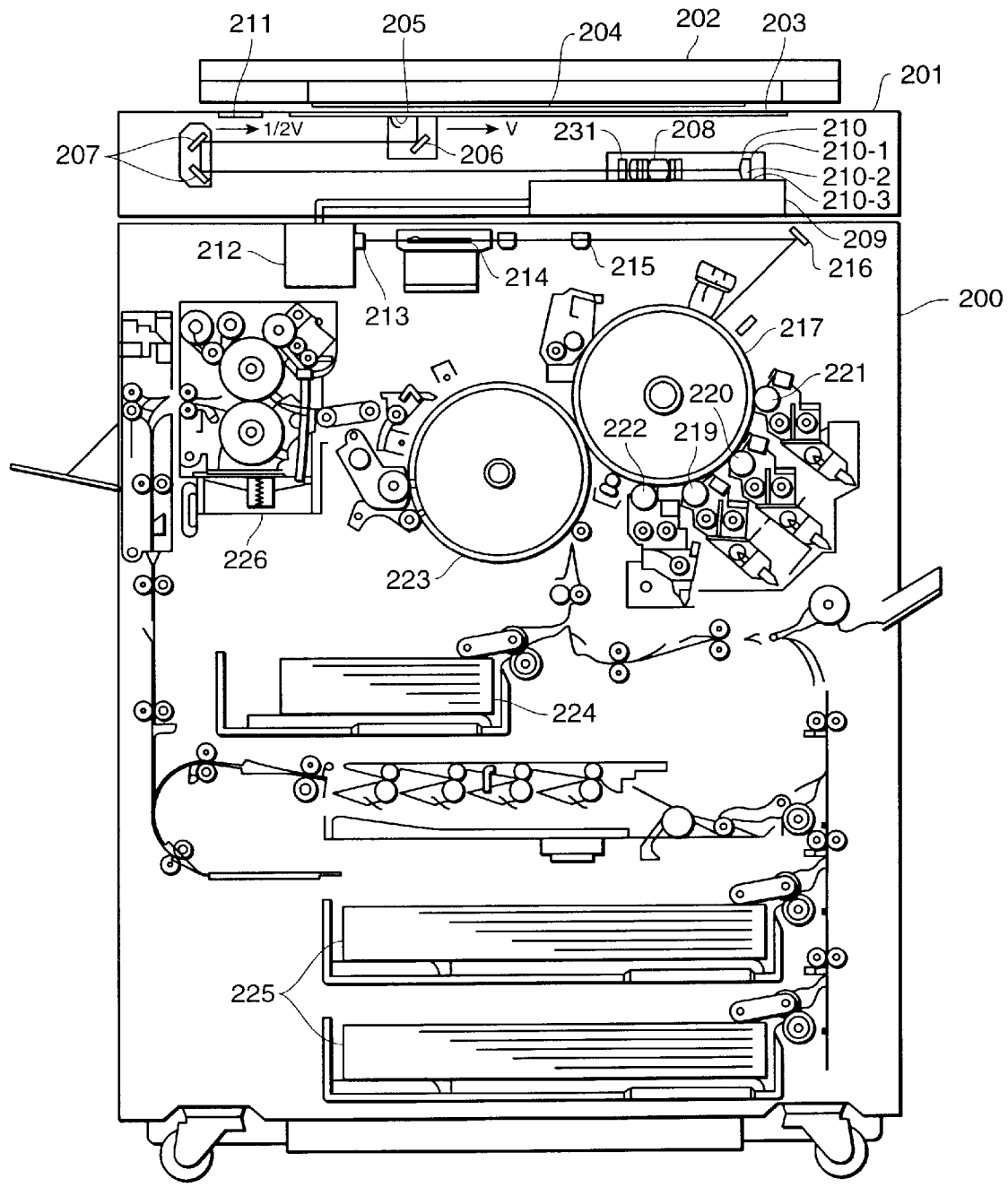
FIG. 2 is a sectional view of a color copier according to an embodiment of the present invention.

FIG. 2 shows a sectional view of an image processing apparatus according to one embodiment of the present invention. In the apparatus of FIG. 2, image scanner 201 reads an original document, and digitally processes read pixel data of the original document into digital signals. Printer 200 then prints out an image corresponding to the original document read by image scanner 201 on a printing sheet in full color.

In image scanner 201, original document 204 is set on a platen glass, covered with a document cover 202, and exposed by halogen lamp 205. Reflected light from original document 204 is further reflected by mirrors 206 and 207, then focuses on CCD 210 for identifying R, G, and B signals after passing through the lens 208. It should be noted that lens 208 is covered by infrared filter 231.

In the preferred embodiment, each row of sensors in CCD 210 for reading respective color components is composed of 5000 pixels, thus CCD 210 can read across the shorter side of an A3-sized original, namely 297 mm, at 400 dpi resolution. CCD 210 separates color information of original document 204 into full-color information of R, G and B components, and converts the full-color information into color signals.

In addition, standard white board 211 generates correction data for correcting read data by R, G, B photo sensors 210-1 to 210-3 of CCD 210. Standard white board 211 has uniform reflection characteristics in the visible light range, and appears white. After correcting the data, CCD 210 then sends the signals to signal processing unit 209.

It should be noted that, halogen lamp 205 and mirror 206 move at speed v, and mirror 207 moves at speed (½)v in a perpendicular direction with respect to an electrical scanning direction of CCD 210 (a main scanning direction). The entire area of original document 204 is scanned in this manner.

Further, in signal processing unit 209, the read signals are electrically processed and separated into color components of magenta (M), cyan (C), yellow (Y), and black (Bk), then sent to printer 200. for each scanning operation by image scanner 201, one of the color component data of M, C, Y, and Bk is sent to printer 200. Thus, by scanning original document 204 four times, one color image is formed.

In printer 200, each image signal of M, C, Y, and BK from image scanner 201 is sent to laser driver 212. Laser driver 212 drives semi-conductor laser 213 by signals modulated on the basis of the image signals. The laser beam scans electrostatic drum 217 via polygon mirror 214, f-θ lens 215, and mirror 216.

The developer unit is composed of magenta developer 219, cyan developer 220, yellow developer 221, and black developer 222. These four drums touch electrostatic drum 217, are configured to turn therewith, and develop latent images of M, C, Y and Bk formed on electrostatic drum 217 with the corresponding color toner. Further, transfer drum 223 attracts a paper sheet fed from paper cassette 224 or 225, and a toner image developed on electrostatic drum 217 is transferred onto the paper sheet. The paper sheet is then ejected after passing through fixing unit 226.

Figure 1:
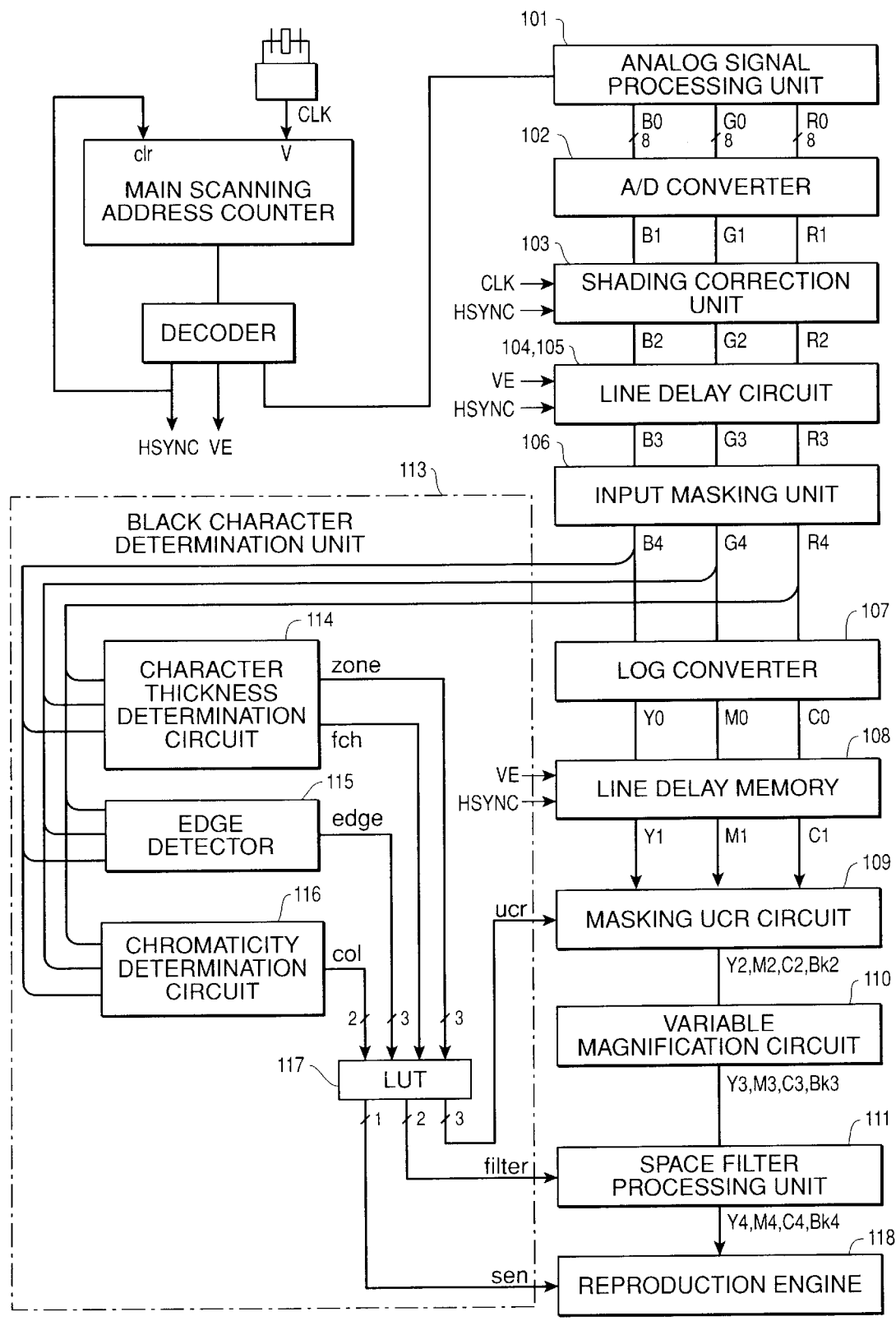
FIG. 1 is a block diagram showing a flow of an image signal within a conventional image processing unit.
Figure 3:
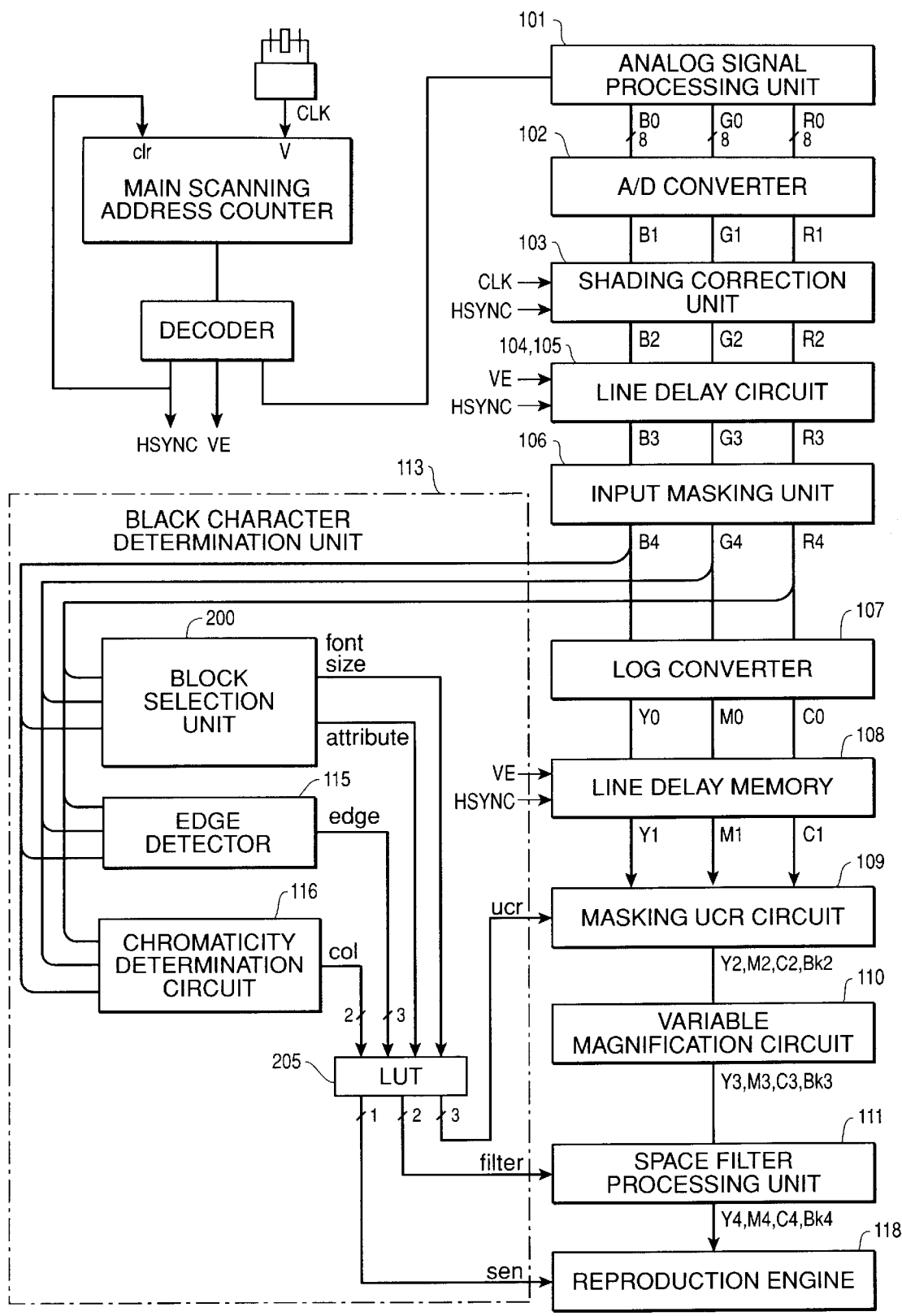
FIG. 3 is a block diagram showing a flow of an image signal according to the present invention.

FIG. 3 is a block diagram showing an image processing flow according to the present invention. The elements shown in FIG. 3 having identical identification numerals as shown in FIG. 1 operate as described above with respect to FIG. 1. In this regard, FIG. 3 shows block selection unit 200, which outputs signals representative of font size and attribute. Although block selection unit 200 appears in FIG. 3 as a hardware unit, it should be noted that the block selection processing described herein and in the applications incorporated by reference herein may be embodied in software or in a combination of software and hardware. Moreover, block selection unit 200 need not be an element of black character determination unit 113.

In operation, block selection unit 200 performs block selection processing on input image data to determine a font size of text in the data as well as attributes of objects within the data. More particularly, for each pixel in input image data, block selection unit 200 assigns a font size of text, if any, in which the pixel is located and an attribute for an object in which the pixel is located.

FIG. 3 also shows LUT 205, having contents different from those of LUT 117. Generally, LUT 205 takes as input signals font size, attribute, edge and col, and outputs signals UCR, FILTER and SEN. The detailed contents of LUT 205 are discussed below.

Figure 4:
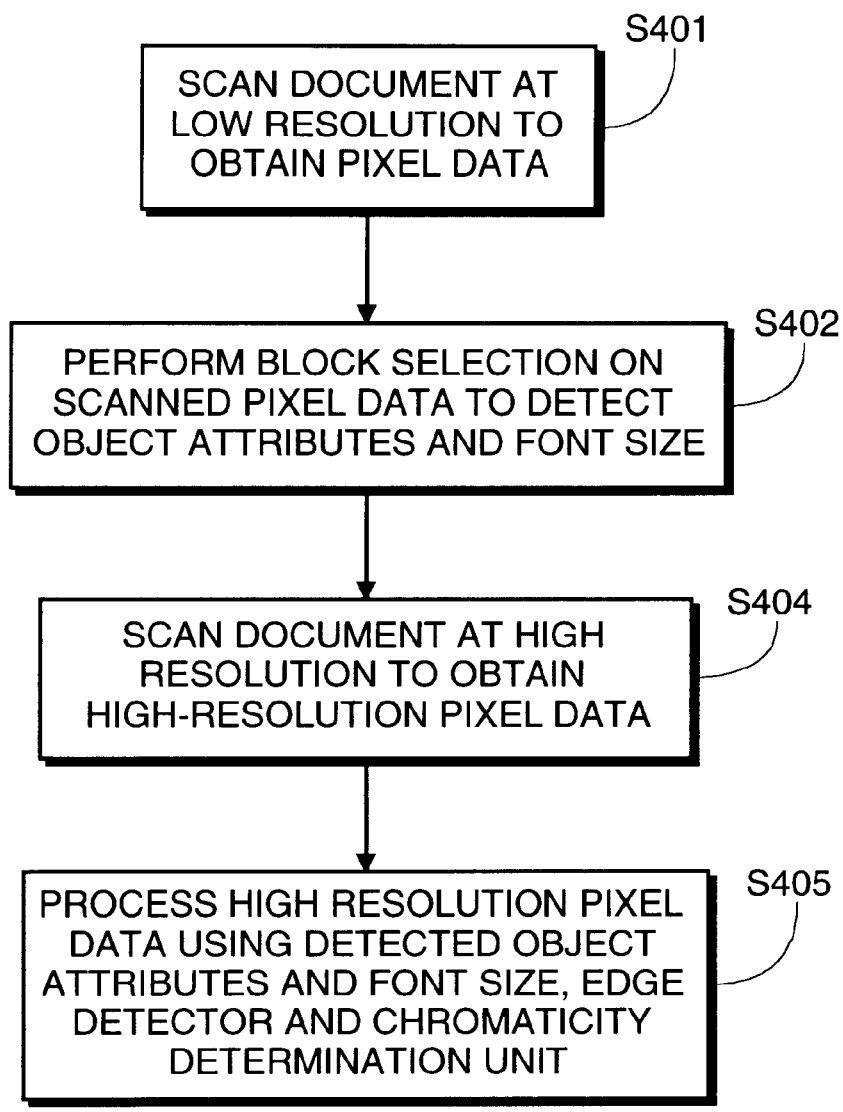
FIG. 4 is a flow chart of process steps to process image data according to the present invention.

FIG. 4 is a flow chart of process steps to process pixel data of a document according to the present invention. Flow begins at step S401, wherein a document is scanned at a low resolution. As described above with respect to FIG. 2, such scanning is performed by image scanner 201 in the preferred embodiment. Of course, other systems for scanning a document can be used in step S401. The document is scanned at a low resolution in step S401 in order to reduce processing time, since low resolution scanning traditionally occurs more quickly than high resolution scanning. In addition, Applicant has discovered that low-resolution pixel data provides satisfactory results when subjected to subsequent block selection processing.

FIG. 5 is a view of a document which can be scanned in step S401. Document 210 includes title 211, horizontal line 212, text area 214, image area 215, line drawing area 216 and table 217. Block selection processing is capable of identifying each of these separate types of object areas, as well as many other types.

In step S402, block selection processing is performed on the pixel data of the scanned document to detect object attributes and font sizes of text located within the scanned document. Conventional block selection (or page segmentation) techniques can be utilized in step S402, including those described in the applications listed above and incorporated by reference herein.

In general, block selection techniques identify objects within an image and assign attributes to the identified objects, such as picture, text, title, table, line drawing or the like. As described in the above listed applications, many other type of attributes may be assigned to the identified objects. In identifying objects, a block selection technique used in accordance with the present invention also detects sizes of individual text characters within text objects.

Next, in step S404, the document is scanned at a high resolution. The resulting high-resolution pixel data is used to produce an output image, therefore high-resolution data is preferable to low-resolution data. In another embodiment of the invention, the document is scanned at high resolution in step S401 and converted to low resolution for subsequent block selection processing in step S402. Accordingly, in this alternative embodiment which includes a high resolution scan at step S401, step S404 is not performed.

After high-resolution pixel data is obtained in step S404, the data is processed using detected object attributes and font sizes as well as using edge detector 115 and chromacity determination unit 116. Such processing is described in detail below.

Figure 6:
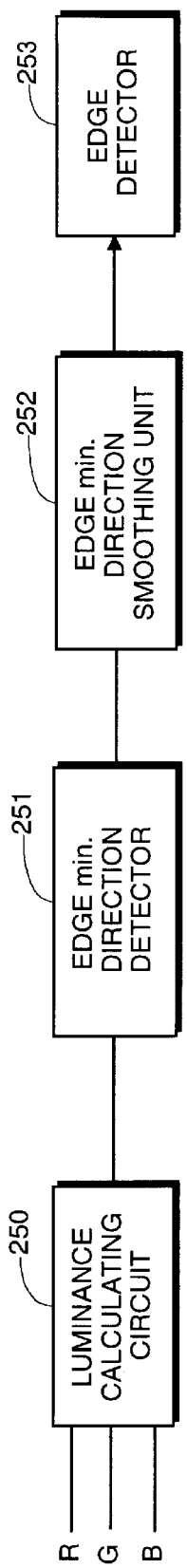
FIG. 6 is a block diagram illustrating an internal construction of an edge detector circuit.
Figure 7:
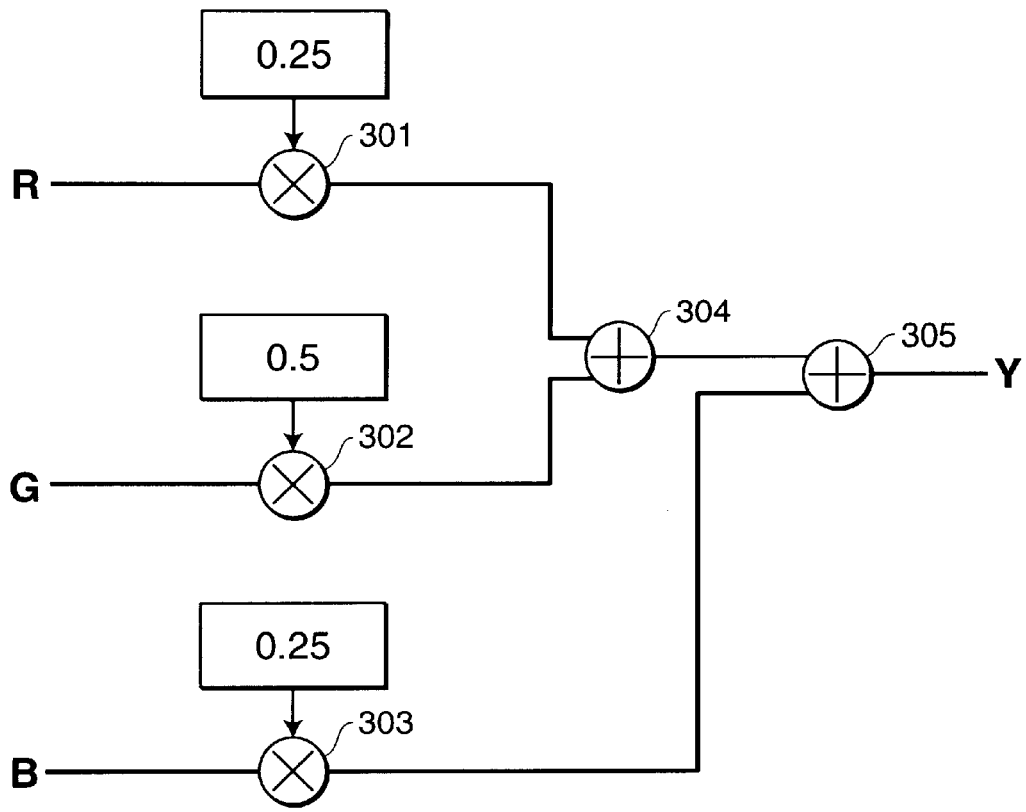
FIG. 7 shows a detailed configuration of a luminance calculating circuit.

As shown in FIG. 3, signals R4, G4 and B4 are masking-converted at input masking unit 106 and then inputted to edge detector 115 of black character determination unit 113. FIG. 6 is a block diagram showing the internal configuration of edge detector 115. Initially, luminance signal Y is calculated based on signals R4, G4 and B4 by luminance calculating circuit 250. FIG. 7 shows a detailed circuit diagram of circuit 250.

In FIG. 7, the inputted color signals R, G and B are multiplied by coefficients 0.25, 0.5 and 0.25 at multipliers 301, 302 and 303, respectively. Then, the obtained values are added at adders 304 and 305. Therefore, luminance signal Y is calculated using the equation $Y=0.25R+0.5G+0.25B$.

Figure 8:
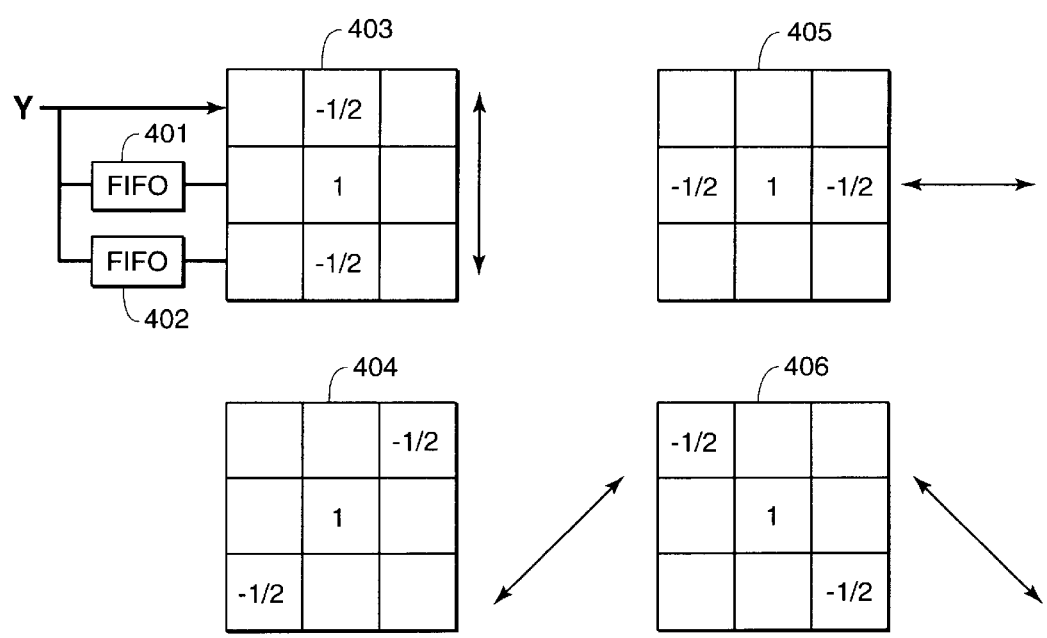
FIG. 8 is a view illustrating line delay by FIFOs and Laplacean filters.

After calculation of luminance signal Y, edge min direction detector 251 of FIG. 6 expands the signal into three lines. FIG. 8 shows FIFOs 401 and 402 of detector 251, each of which causes one line delay. The three lines are then filtered by known Laplacean filters 403 to 406. Then, as shown in FIG. 8, detector 251 determines a direction in which an absolute value a of the amount of edged component output from a filter is at a minimum. The determined direction is denoted as the edge min direction.

Next, at edge min direction smoothing unit 252, a smoothing process is applied to luminance signal Y in the edge min direction. By applying the smoothing process, it is possible to maintain the edge component in the direction where the edge component is the largest, and to smooth edge components in other directions.

In other words, for screened dot components having larger edge components in a plurality of directions, edge components are smoothed by edge detector 115, whereas, for a character/line having an edge component in only one direction, its characteristic is maintained. Note that by repeating this process as many times as necessary, a line component is separated from a screened dot component more effectively, thereby making it possible to detect a character component contained in a screen dot.

Figure 9A:
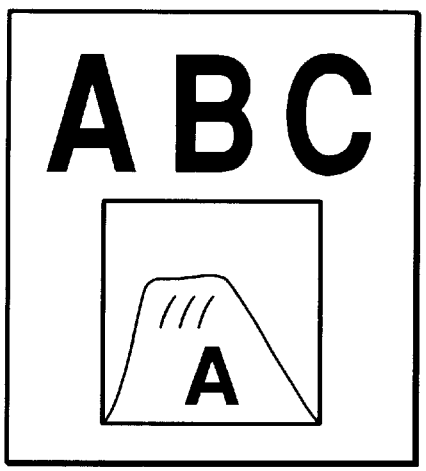
FIG. 9A and FIG. 9B illustrate an example of edge detection.
Figure 9B:
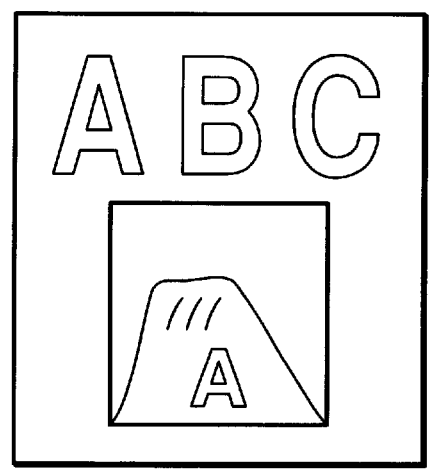

The input signals are then filtered by the aforementioned Laplacean filters by edge detector 253 to eliminate signals having absolute values of edge amount which are less or equal to value a. As a result, signals having absolute values of edge amount which are larger than value a are outputted as logical "1's". FIGS. 9A and 9b show an example of edge detection, wherein image data of luminance data Y in FIG. 9A is output as an edge detection signal as shown in FIG. 9B.

Edge detector 115 outputs a three bit "edge" signal including one of five codes. The codes indicate that an edge is found around a subject pixel using a mask of block size of 7×7 around the pixel, a mask of block size of 5×5, a mask of block size of 3×3, no mask, or that no edge is found around the pixel. In other words, the "edge" signal is a three-bit code containing a total of five kinds of information, that is, information as to whether there is any pixel determined as an edge pixel in a pixel block of 7×7 around a subject pixel, in a 5×5 pixel block, and in a 3×3 pixel block, where all the blocks include a subject pixel, and whether or not the subject pixel is determined to be an edge pixel.

Figure 10:
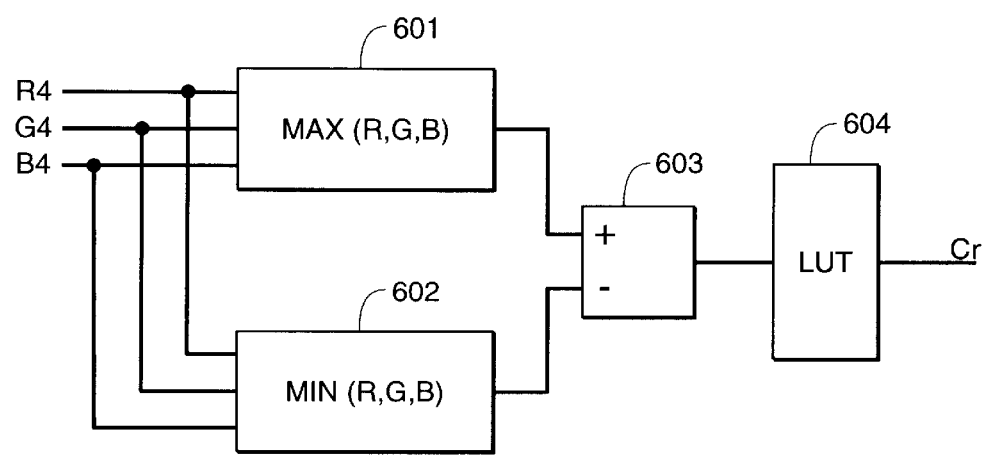
FIG. 10 is a block diagram of a chromaticity determination circuit.

FIG. 10 is a block diagram illustrating the configuration of chromaticity determination circuit 116. At maximum value detector 601 and minimum value detector 602, a maximum value, max(R,G,B) and a minimum value, min (R,G,B) are respectively extracted from the inputted color signals R4, G4 and B4, and the difference ΔC=max(R,G,B)−min(R,G,B) is calculated by subtractor 603. Next, at LUT 604, data conversion in accordance with characteristics as shown in FIG. 11 is performed, and a chromaticity signal Cr is generated.

Figure 11:
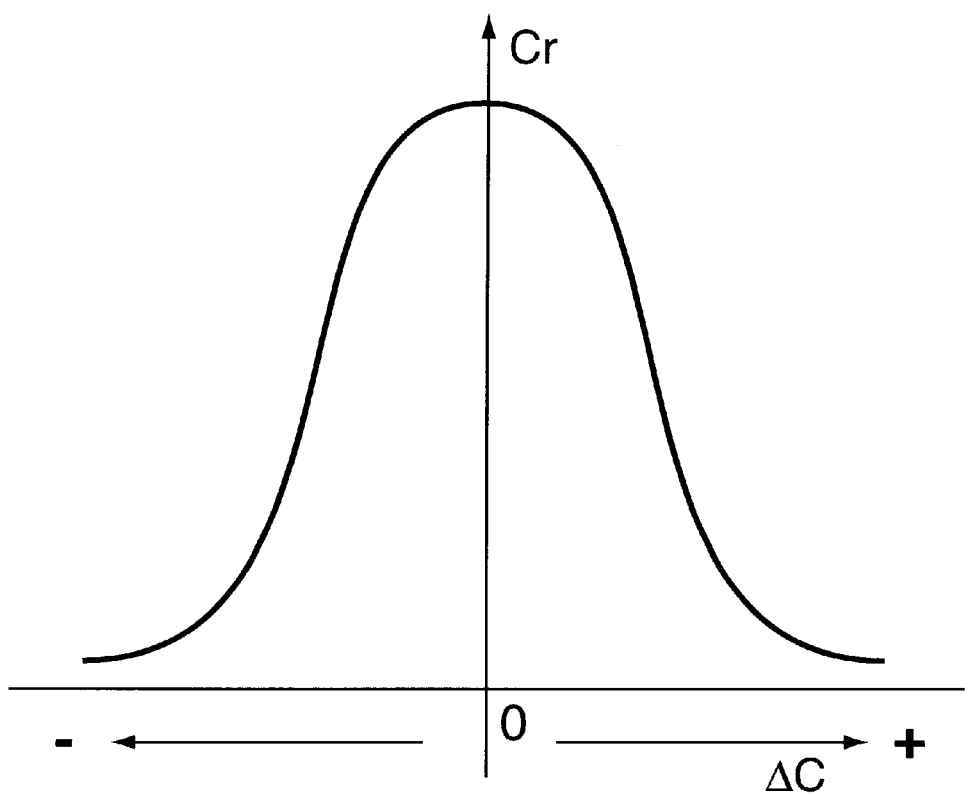
FIG. 11 illustrates characteristics of data conversion in a lookup table.

FIG. 11 shows that as the chromaticity becomes lower (closer to non-chromaticity), a value of ΔC approaches 0, whereas as the chromaticity becomes higher, a value of ΔC increases. In other words, Cr has a larger value as the non-chromaticity of color becomes larger, whereas the value of Cr approaches 0 as chromaticity becomes larger. It should be noted that a signal "col", outputted from chromaticity determination circuit 116 in FIG. 3, represents "color", "black", "gray" (indicating a color between "color" and "black"), or "white" using a two-bit code.

LUT 205 receives the font size and attribute signals from block selection unit 200, the edge signal from edge detector 115 and the col signal from chromacity determination circuit 116. LUT 205 then outputs a UCR, FILTER and SEN having values as described in the Background Of The Invention section of the present application. However, according to the present invention, the UCR, FILTER and SEN signals are based on the contents of LUT 205 and the aforementioned font size, attribute, edge and col signals.

FIG. 12 illustrates the contents of LUT 205. As shown, LUT 205 assigns corresponding UCR, FILTER and SEN values based on the col, attribute, font size and edge signals. Due to the signals output by block selection unit 200, the contents of LUT 205 can be specified to provide more appropriate processing to subject pixel data. For example, character thickness determination circuit 114 of FIG. 1 produces output signals intending to represent a type of area in which a subject pixel resides. Using block selection unit 200, more accurate judgement of an area, as well as of text size within the area, is obtained. Accordingly, more appropriate processing can be performed on the area.

One example of processing using values of LUT 205 considers performing sharpening processing (FILTER=1) on a subject pixel determined to be a text pixel and an edge pixel, and performing smoothing processing (FILTER=3) on the subject pixel in a case that the subject pixel is not determined to be a text pixel and not determined to be an edge pixel. In addition, for a pixel determined to be a text pixel and not an edge pixel, it is assumed that the pixel is part of an internal area of a text character and therefore internal smoothing processing (FILTER=0) is performed on the pixel. In another example, for pixels in a non-text area, a general smoothing processing (FILTER=3) is performed. Of course, other combinations of smoothing processing, under color removal and selected printing resolutions can be employed in accordance with the present invention, many of which are illustrated by the values shown in FIG. 12.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. An image processing method, comprising:

inputting image data;

performing block selection processing on the input image data to determine attributes of objects represented by pixel data within the image data;

a first determining step of determining, based on the block selection processing, if subject pixel data represents a text pixel;

a second determining step of determining if the subject pixel data represents an edge pixel;

performing a first processing on the subject pixel data in a case that the subject pixel data is determined to represent a text pixel and an edge pixel; and performing a second processing on the subject pixel data in a case that the subject pixel data is not determined to represent a text pixel and is not determined to represent an edge pixel, wherein at least the first processing on the subject pixel data is performed based at least in part on a font size associated with the pixel data.

2. An image processing method according to claim 1, wherein the inputting step comprises:

a pre-scanning step to input image data of a first resolution; and a scanning step to input image data of a second resolution, the second resolution higher than the first resolution, wherein the block selection processing is performed on the image data of the first resolution, and wherein the second determining step is performed on the image data of the second resolution.

3. An image processing method according to claim 1, wherein the inputting step comprises:

a pre-scanning step to input image data of a first resolution; and a scanning step to input image data of a second resolution, the second resolution higher than the first resolution, wherein the block selection processing is performed on the image data of the first resolution, and wherein the first processing and the second processing are performed on the image data of the second resolution.

4. An image processing method according to claim 1, wherein the first processing is sharpening processing and the second processing is smoothing processing.

5. An image processing method according to claim 1, further comprising: a third determining step of determining whether the subject pixel data represents a halftone pixel; and performing a third processing on the subject pixel data in a case it is determined that the subject pixel data represents a halftone pixel.

6. An image processing method according to claim 1, wherein the step of performing block selection comprises determining sizes of text characters within the input image data.

7. An image processing method, the method comprising:

inputting image data;

performing block selection processing on the input image data to determine types of pixel data within the image data;

a first determining step of determining, based on the block selection processing, if subject pixel data represents a text pixel;

a second determining step of determining if the subject pixel data represents an edge pixel;

performing a first processing on the subject pixel data in a case that the subject pixel data is determined to represent a text pixel and an edge pixel; and performing a second processing on the subject pixel data in a case that the subject pixel data is not determined to represent a text pixel and is not determined to represent an edge pixel, wherein the types of pixel data comprise text on halftone, line art, line, title, table, halftone, frame and background.

8. Processor-executable process steps stored on a processor-readable medium, the process steps comprising:

an inputting step to input image data;

a performing step to perform block selection processing on the input image data to determine attributes of objects represented by pixel data within the image data;

a first determining step to determine, based on the block selection processing, if subject pixel data represents a text pixel;

a second determining step to determine if the subject pixel data represents an edge pixel;

a processing step to perform a first processing on the subject pixel data in a case that the subject pixel data is determined to represent a text pixel and an edge pixel; and a processing step to perform a second processing on the subject pixel data in a case that the subject pixel data is not determined to represent a text pixel and is not determined to represent an edge pixel, wherein at least the first processing on the subject pixel data is performed based at least in part on a font size associated with the pixel data.

9. Processor-executable process steps according to claim 8, wherein the inputting step comprises:

a pre-scanning step to input image data of a first resolution; and a scanning step to input image data of a second resolution, the second resolution higher than the first resolution, wherein the block selection processing is performed on the image data of the first resolution, and wherein the second determining step is performed on the image data of the second resolution.

10. Processor-executable process steps according to claim 8, wherein the inputting step comprises:

a pre-scanning step to input image data of a first resolution; and a scanning step to input image data of a second resolution, the second resolution higher than the first resolution, wherein the block selection processing is performed on the image data of the first resolution, and wherein the first processing end the second processing are performed on the image data of the second resolution.

11. Processor-executable process steps according to claim 8, wherein the first processing is sharpening processing and the second processing is smoothing processing.

12. Processor-excecutable process steps according to claim 8, further comprising:

a third determining step to determine whether the subject pixel data represents a halftone pixel; and a processing step to perform a third processing on the subject pixel data in a case it is determined that the subject pixel data represents a halftone pixel.

13. Processor-executable process steps according to claim 8, wherein the step of performing block selection comprises a determining step to determine sizes of text characters within the input image data.

14. Processor-executable process steps stored on a processor-readable medium, the process steps comprising:

an inputting step to input image data;

a performing step to perform block selection processing on the input image data to determine types of pixel data within the image data;

a first determining step to determine, based on the block selection processing, if subject pixel data represents a text pixel;

a second determining step to determine if the subject pixel data represents an edge pixel;

a processing step to perform a first processing on the subject pixel data in a case that the subject pixel data is determined to represent a text pixel and an edge pixel; and a processing step to perform a second processing on the subject pixel data in a case that the subject pixel data is not determined to represent a text pixel and is not determined to represent an edge pixel, wherein the types of pixel data comprise text on halftone, line art, line, title, table, halftone, frame and background.

15. An image processing apparatus, comprising:

means for inputting image data;

means for performing block selection processing on the input image data to determine attributes of objects represented by pixel data within the image data;

first determining means for determining, based on the block selection processing, if subject pixel data represents a text pixel;

second determining means for determining if the subject pixel data represents an edge pixel;

means for performing a first processing on the subject pixel data in a case that the subject pixel data is determined to represent a text pixel and an edge pixel; and means for performing a second processing on the subject pixel data in a case that the subject pixel data is not determined to represent a text pixel and is not determined to represent an edge pixel, wherein at least the first processing on the subject pixel data is performed based at least in part on a font size associated with the pixel data.

16. An image processing apparatus according to claim 15, wherein the means for inputting comprises:

means for inputting image data of a first resolution; and means for inputting image data of a second resolution, the second resolution higher than the first resolution, wherein the block selection processing is performed on the image data of the first resolution, and wherein the second determining means operates on the image data of the second resolution.

17. An image processing apparatus according to claim 15, wherein the inputting means comprises:

means for inputting image data of a first resolution; and means for inputting image data of a second resolution, the second resolution higher than the first resolution, wherein the block selection processing is performed on the image data of the first resolution, and wherein the first processing and the second processing are performed on the image data of the second resolution.

18. An image processing apparatus according to claim 15, wherein the first processing is sharpening processing and the second processing is smoothing processing.

19. An image processing apparatus according to claim 15, further comprising:

third determining means for determining whether the subject pixel data represents a halftone pixel; and means for performing a third processing on the subject pixel data in a case it is determined that the subject pixel data represents a halftone pixel.

20. An image processing apparatus according to claim 15, wherein said means for performing block selection determines sizes of text characters within the input image data.

21. An image processing apparatus comprising:

means for inputting image data;

means for performing block selection processing on the input image data to determine types of pixel data within the image data;

first determining means for determining, based on the block selection processing, if subject pixel data represents a text pixel;

second determining means for determining if the subject pixel data represents an edge pixel;

means for performing a first processing on the subject pixel data in a case that the subject pixel data is determined to represent a text pixel and an edge pixel; and means for performing a second processing on the subject pixel data in a case that the subject pixel data is not determined to represent a text pixel and is not determined to represent an edge pixel, wherein the types of pixel data comprise text on halftone, line art, line, title, table, halftone, frame and background.

* * * * *

UNITED STATES PATENT AND TRADEMARK OFFICE
CERTIFICATE OF CORRECTION

PATENT NO. : 6,718,059 B1
DATED : April 6, 2004
INVENTOR(S) : Yoshiki Uchida

It is certified that error appears in the above-identified patent and that said Letters Patent is hereby corrected as shown below:

Column 2,
Line 18, "indicated" should read -- indicate --.

Column 7,
Line 24, "chromacity" should read -- chromaticity --.

Column 8,
Line 37, "a scanning" should read -- ¶a scanning --;
Lines 39 and 41, "wherein" should read -- ¶wherein --;
Line 48, "a third" should read -- ¶a third --; and
Line 50, "performing" should read -- ¶performing --.

Column 9,
Line 53, "end" should read -- and --.

Signed and Sealed this

Twenty-eighth Day of September, 2004

JON W. DUDAS
*Director of the United States Patent and Trademark Office*